F. T. MUSSO.
AUTOMATIC OILER FOR VEHICLES.
APPLICATION FILED APR. 22, 1907.
901,460.
Patented Oct. 20, 1908.
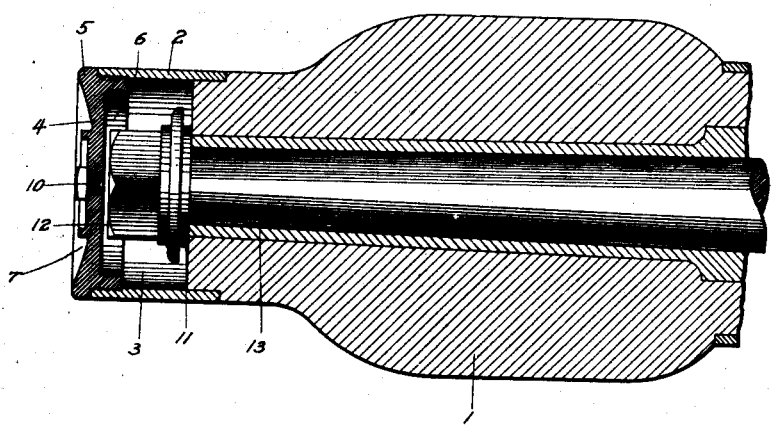
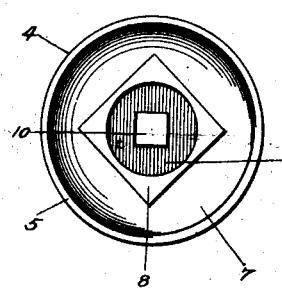
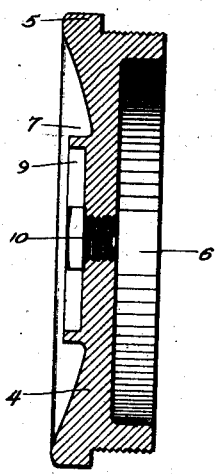
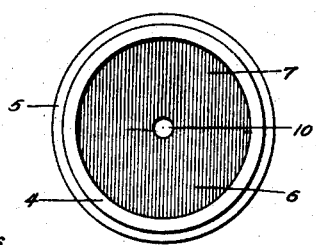
Witnesses
Frank A. Carter
J. B. Webster
Inventor
Fedele T. Musso,
By Percy S. Webster
Attorney

UNITED STATES PATENT OFFICE.

FEDELE T. MUSSO, OF BOWMAN, CALIFORNIA.

AUTOMATIC OILER FOR VEHICLES.

No. 901,460.　　　　　Specification of Letters Patent.　　　　Patented Oct. 20, 1908.

Application filed April 22, 1907.　Serial No. 369,672.

*To all whom it may concern:*

Be it known that I, FEDELE T. MUSSO, a citizen of the United States, residing at Bowman, in the county of Placer and State of California, have invented certain new and useful Improvements in Automatic Oilers for Vehicles; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in oilers and particularly to those used on vehicles, my object being to produce such a device as will automatically oil the vehicle and at the same time keep the same neat and clean and not oily, dusty and unsightly; also to produce an oiling means which will prevent the necessity of the removal of the wheels, the dropping of nuts in the dirt, the soiling of hands or clothes, or the getting of dust or dirt on the spindles. This object I accomplish by means of closed substantially air tight cups in the outer ends of the hubs of the vehicle and a means for filling said cups with oil and drawing the same onto the axles; also by such other and further construction as will appear by a perusal of the following specification and claims.

In the drawings similar characters of reference indicate corresponding parts in the several views.

Figure 1 is a sectional view of a hub with my improved device installed thereon. Fig. 2 is an end view of my improved device. Fig. 3 is an enlarged sectional view taken of Fig. 2. Fig. 4 is a bottom plan view of the device.

Referring more particularly to the reference numerals on the drawings 1 designates the hub of a vehicle having the usual outer hub band 2 forming the socket 3.

4 is a cap adapted to be screwed into the band 2, there being a shoulder 5 on said cap adapted to bear tightly against the outer edge of the said band 2, thus producing a tight joint between the hub band 2 and cap 4 and providing the socket 3 with a tight cap for the purpose as set forth. Formed within said cap 4 is a socket 6 for the purpose of making room for the nut on the spindle. The front of the cap 4 is formed with a depression 7 formed outward from which is a square shoulder 8, there being a socket 9 within said shoulder 8.

10 is a screw plug extending through the cap 4 within the socket 9.

11 is a felt washer disposed between the nut 12 of the vehicle and the hub, and encircling the spindle 13.

In operation, when it is desired to lubricate the vehicle, the screw plug 10 is removed and the socket 3 filled with suitable lubricating oil, after which the plug 10 is replaced. The felt washer 11 although allowing the oil to percolate therethrough is designed to prevent too great a flow of oil from the containing socket to the vehicle spindle; said felt washer may however, be dispensed with if desired. The socket 3 being provided with tightly fitting outer cap 4 for retaining the lubricant and the washer being positioned as disclosed a flowing of the oil to the spindle of the vehicle for the purposes of lubricating the same will be facilitated upon the revolving of the wheels of the vehicle.

The shoulder 8 permits of a wrench being inserted thereover for the purpose of unscrewing the cap 4 and removing the nut 12 or cleaning out the socket 3. The sockets 7 and 9 permit of the shoulders 8 and plug 10 being in substantial alinement with the outer edge of the shoulder 5 thus making a and durability to the hub.

A few of the advantages gained by my improved device are as follows:—The outer end of the hub always presents a neat and clean appearance. There is no danger of soiling hands or clothes against the end of the hub. No dust, sand or other dirt can get on spindle through end of the hub. There will be no dropping or losing of nuts or washers. There will be no jack or wrench needed to oil wheels. There will be no loss of time in taking nuts and wheels off and putting them back. The addition to the hub of the parts just described adds strength and durability to the hub.

Thus it will be seen that I have produced a device which substantially fulfils all the objects of the invention as set forth herein.

While this specification sets forth in detail the present and preferred construction of the device, however in practice many small deviations therefrom as come within the scope of the appended claims may be resorted to without departing from the spirit of my invention.

Having thus described my invention what I claim as new and useful and desire to secure by Letters Patent is:—

A device of the character described comprising a spindle, a hub mounted thereon, a nut mounted on the end of said spindle, said hub having an annular band secured thereto and projecting beyond the outer end thereof, the outer portion of said band being internally screw-threaded and provided with a tightly fitting cap threaded therein and coöperating therewith to form an oil chamber within said band, an annular shoulder upon said cap contacting the outer edge of said band when the same is screwed within the latter, a depression in an outer face of said cap, a wrench engaging means carried by the outer face of said cap and positioned centrally within said depression and lying below the plane of the surrounding cap portion, said cap being provided within said wrench engaging means with an aperture normally closed by a removable screw-threaded plug, a felt washer disposed between the nut and the end of said hub and disposed between said oil chamber and the surface to be lubricated and adapted to retard the flow of lubricant therebetween.

In testimony whereof I affix my signature in presence of two witnesses.

FEDELE T. MUSSO.

Witnesses:
PERCY S. WEBSTER,
FRANK H. CARTER.